United States Patent
Wuidart

(10) Patent No.: US 8,564,413 B2
(45) Date of Patent: Oct. 22, 2013

(54) RECHARGE OF AN ACTIVE TRANSPONDER

(75) Inventor: Luc Wuidart, Pourrieres (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 533 days.

(21) Appl. No.: 12/431,465

(22) Filed: Apr. 28, 2009

(65) Prior Publication Data

US 2009/0273452 A1 Nov. 5, 2009

(30) Foreign Application Priority Data

Apr. 30, 2008 (FR) ...................................... 08 52918

(51) Int. Cl.
*H04Q 5/22* (2006.01)
*G08B 13/14* (2006.01)
*H04B 5/00* (2006.01)
*H05B 6/12* (2006.01)

(52) U.S. Cl.
USPC ... 340/10.4; 340/10.1; 340/572.1; 340/572.7; 340/693.1; 455/41.1; 455/41.2; 219/627; 219/665

(58) Field of Classification Search
USPC .............. 340/10.1–10.6, 572.1–572.7, 693.1, 340/573.1, 539.1; 455/41.1, 41.2
See application file for complete search history.

(56) References Cited

U.S. PATENT DOCUMENTS

| | | | | |
|---|---|---|---|---|
| 6,070,803 A * | 6/2000 | Stobbe | .......................... | 235/492 |
| 6,462,647 B1 | 10/2002 | Roz | | |
| 6,944,424 B2 * | 9/2005 | Heinrich et al. | ............. | 455/41.1 |
| 7,209,014 B2 * | 4/2007 | Finkenzeller et al. | .. | 331/117 FE |
| 7,397,381 B2 * | 7/2008 | DiPiazza | ..................... | 340/573.1 |
| 8,063,746 B2 * | 11/2011 | Borcherding | .............. | 340/10.34 |
| 2002/0008612 A1 | 1/2002 | Wuidart | | |
| 2003/0017804 A1 | 1/2003 | Heinrich et al. | | |
| 2003/0102303 A1 * | 6/2003 | Clothier et al. | ................ | 219/627 |
| 2005/0156752 A1 | 7/2005 | Finkenzeller et al. | | |

FOREIGN PATENT DOCUMENTS

| | | |
|---|---|---|
| EP | 0 857 981 | 8/1998 |
| JP | 09215228 | 8/1997 |
| JP | 2000090220 | 3/2000 |
| JP | 2001308758 | 11/2001 |
| JP | 2005323178 | 11/2005 |
| JP | 2006287844 | 10/2006 |

OTHER PUBLICATIONS

French Search Report dated Dec. 4, 2008 from corresponding French Application No. 08/52918, filed Apr. 30, 2008.

* cited by examiner

*Primary Examiner* — Daniel Wu
*Assistant Examiner* — Mancil Littlejohn, Jr.
(74) *Attorney, Agent, or Firm* — Wolf, Greenfield & Sacks, P.C.

(57) ABSTRACT

A method for configuring a terminal capable of emitting a radio-frequency field for a transponder including, in the presence of a transponder within the range of the terminal, at least one step of adaptation of the series resistance of an oscillating circuit of the terminal, according to an off-load value, which depends on an operation of the terminal while no transponder is in its field.

17 Claims, 6 Drawing Sheets

RECHARGE OF AN ACTIVE TRANSPONDER

CROSS REFERENCE TO RELATED APPLICATIONS

This application claims the priority benefit of French patent application Ser. No. 08/52918, filed on Apr. 30, 2008, entitled "RECHARGE OF AN ACTIVE TRANSPONDER," which is hereby incorporated by reference to the maximum extent allowable by law.

BACKGROUND OF THE INVENTION

1. Field of the Invention

The present invention generally relates to systems using transponders, that is, transceivers (generally mobile) capable of communicating in a contactless and wireless manner with a terminal. The present invention more specifically relates to systems using active transponders provided with a rechargeable battery.

2. Discussion of the Related Art

Two categories of transponders are generally distinguished according to whether or not they are equipped with a battery.

So-called passive transponders extract the power necessary to the operation of the electronic circuits that they comprise from a high-frequency field radiated by a terminal with which they communicate. Such transponders are generally reserved for transmissions within a short range (on the order of a few meters). The storage of the power received from the terminal is performed by a capacitor connected to the transponder antenna.

So-called active transponders to which the present invention more specifically applies comprise a battery providing the power necessary to their operation. Such transponders are capable of operating at a longer range (up to a few hundreds of meters) since they need no power transfer between the terminal and the transponder.

Active transponders which take advantage of situations in which they are at a short distance from a terminal to recharge their battery are also known.

For example, document EP-A-0999517 (or U.S. Pat. No. 6,462,647) describes a rechargeable active transponder equipped with a storage capacitor for storing power originating from a received radio-electric signal, charge means being provided to recharge a battery from the power stored in the capacitor.

Document U.S. Pat. No. 6,944,424 describes an electronic tag capable of being powered by an internal battery and, passively, by a radio-frequency field. A power storage device is coupled to the battery to enable its recharge.

The power originating from the electromagnetic coupling between the transponder and the terminal which is capable of being used to recharge the transponder battery is often insufficient and/or requires too long a recharge time to be effective. As a result, in many cases, an active transponder stops in practice to operate at long distance once its original battery has been discharged, unless this transponder is left for a long time within the range of a terminal to be recharged, which is not always easy.

For example, in an automobile vehicle where the transponder is the vehicle key, the key remains at a short distance from the terminal contained by the vehicle all along travels. It can thus be recharged during this period. However, when the vehicle is not in use, the key is no longer within the range of the vehicle terminal and is thus not recharged.

In other applications, it is almost impossible for the transponder to remain for a long time within the range of the terminal with which it is supposed to communicate. For example, for chip cards used in transports, the time period for which the transponder is within the range of a terminal generally corresponds to the time to perform an information exchange and does not always allow to properly recharge a battery. Further, for reasons of anti-collision of the exchanges between the many transponders and terminals which are, in this type of application, close to one another, the communication (and thus the recharge) is only set up in very close coupling (less than 10 centimeters), which in practice amounts to having to lay the card on the terminal's housing in a designated area corresponding to the position closest to the antenna.

Further, transponders of a given type are generally only capable of being recharged from dedicated terminals, which is not always convenient.

EP-A-1 154 367 discloses a terminal for communicating with an electromagnetic transponder and capable of validating the presence of a transponder in its field. This document provides modifying the value of a capacitive element of the oscillating circuit to modify its tuning.

SUMMARY OF THE INVENTION

It would be desirable to have a rechargeable active transponder, a terminal of recharge and/or of communication with transponders, and a rechargeable active transponder system, which overcome all or part of the disadvantages of current systems.

It would in particular be desirable to have a terminal capable of recharging in optimized fashion an active transponder by taking advantage even of short periods of exposure of the transponder to the remote-supply field.

It would also be desirable to preserve the functionalities of an active transponder and of a passive transponder within a same device.

It would also be desirable for an active transponder to be able to recharge when it is within the range of different terminals without requiring dedicated terminals.

More generally, it would be desirable to optimize the power transfer from a terminal to a transponder.

To achieve all or part of these and other objects, at least one embodiment of the present invention provides a method for configuring a terminal capable of emitting a radio-frequency field for a transponder in which, in the presence of a transponder within the range of the terminal, the series resistance of an oscillating circuit of the terminal is adapted, according to an off-load value, which depends on an operation of the terminal while no transponder is in its field.

According to an embodiment, said off-load value is characteristic of the current in the oscillating circuit of the terminal.

According to an embodiment, the method comprises the steps of:

measuring information representative of the current in the oscillating circuit of the terminal with a first value of series resistance of this oscillating circuit;

comparing this information with said off-load value; and modifying the series resistance towards a second value selected according to the first value, to the measured information, and to said off-load value.

According to an embodiment, the value of the series resistance is selected so that the ratio between the measured information and said off-load value is approximately equal to 2.

According to an embodiment, a charge cycle of a battery comprised in the transponder is triggered once the value of the series resistance has been set.

At least one embodiment of the present invention also provides a terminal for generating a field for a transponder, comprising an oscillating circuit equipped with a phase regulation loop and with a circuit of switchable resistors having their value selected based on an estimate of the coefficient of the coupling with the transponder.

According to an embodiment, the value of the resistance is selected according to the method described hereabove.

At least one embodiment of the present invention also provides a portable device comprising a terminal.

At least one embodiment of the present invention also provides a transponder capable of communicating with a terminal and of being recharged by said terminal.

According to an embodiment, the transponder comprises means for transmitting to the terminal information about the charge level of its battery.

At least one embodiment of the present invention also provides a communication system comprising:

a terminal; and a transponder.

The foregoing objects, features, and advantages of the present invention will be discussed in detail in the following non-limiting description of specific embodiments in connection with the accompanying drawings.

DETAILED DESCRIPTION

Figure 1:
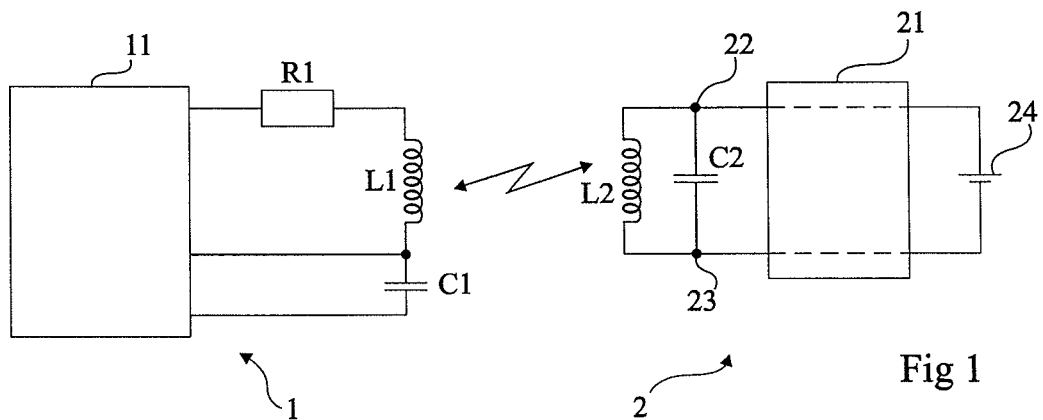
FIG. 1 very schematically shows an example of a radio-frequency communication system with an active transponder.

The same elements have been designated with the same reference numerals in the different drawings. For clarity, only those steps and elements which are useful to the understanding of the present invention have been shown and will be described. In particular, the origin and the destination of the data transmitted during communications between a transponder and a terminal have not been detailed, the present invention being compatible with any usual communication.

FIG. 1 very schematically shows an example of a communication and remote-supply system comprising a terminal 1 or read/write terminal, and a transponder 2.

Generally, terminal 1 comprises a series oscillating circuit, formed of an inductance L1 in series with a capacitor C1 and a resistor R1. The series oscillating circuit is controlled by a device 11 comprising, among others and non-limitingly, an amplifier or antenna coupler and a circuit for controlling and exploiting the transmissions, especially provided with a modulator/demodulator and with a control and data processing circuit (generally, a microprocessor). Device 11 generally communicates with different input/output circuits (keyboard, display, element of exchange with a server, etc.) and/or processing circuits, not shown. The elements of terminal 1 draw the power necessary to their operation from a power supply circuit (not shown) connected, for example, to the power line distribution system or to a battery (for example, that of an automobile vehicle or of a portable telephone or computer).

An active transponder 2 capable of cooperating with a terminal 1 comprises an oscillating circuit, for example, parallel, formed of an inductance L2 in parallel with a capacitor C2 between two input terminals 22 and 23 of a control and processing circuit 21. In the shown example, transponder 2 also comprises a rechargeable battery 24 capable of supplying the power of the different elements of transponder 2, at least when said transponder is not within short range of a terminal. Terminals 22 and 23 are, in practice, connected to the input of a rectifying element (not shown in FIG. 1) having its outputs forming power supply terminals of the circuits internal to the transponder. These circuits generally comprise a memory and a modulator for transmitting information to the terminal. According to the transponder type (depending on the application and on the tasks that it is supposed to carry out), these circuits may also comprise a demodulator of the signals possibly received from the terminal, a microprocessor, and various other processing circuits.

The oscillating circuits of the terminal and of the transponder are generally tuned to a same frequency corresponding to the frequency of an excitation signal of the oscillating circuit of the terminal. This high-frequency signal (for example, 13.56 MHz) is not only used as carrier for transmitting data from the terminal to the transponder, but also as a remote-supply carrier for the transponders located in the terminal's field. When a transponder 2 is in the field of a terminal 1, a high-frequency voltage is generated between terminals 21 and 23 of the transponder's resonant circuit. This voltage, on the one hand, is used to provide the supply voltage of electronic circuits 21 of the transponder when it is in passive mode and, on the other hand, may be used to charge its battery 24, this battery being used to power the transponder circuits when the transponder is not within the range of a terminal.

Figure 2:
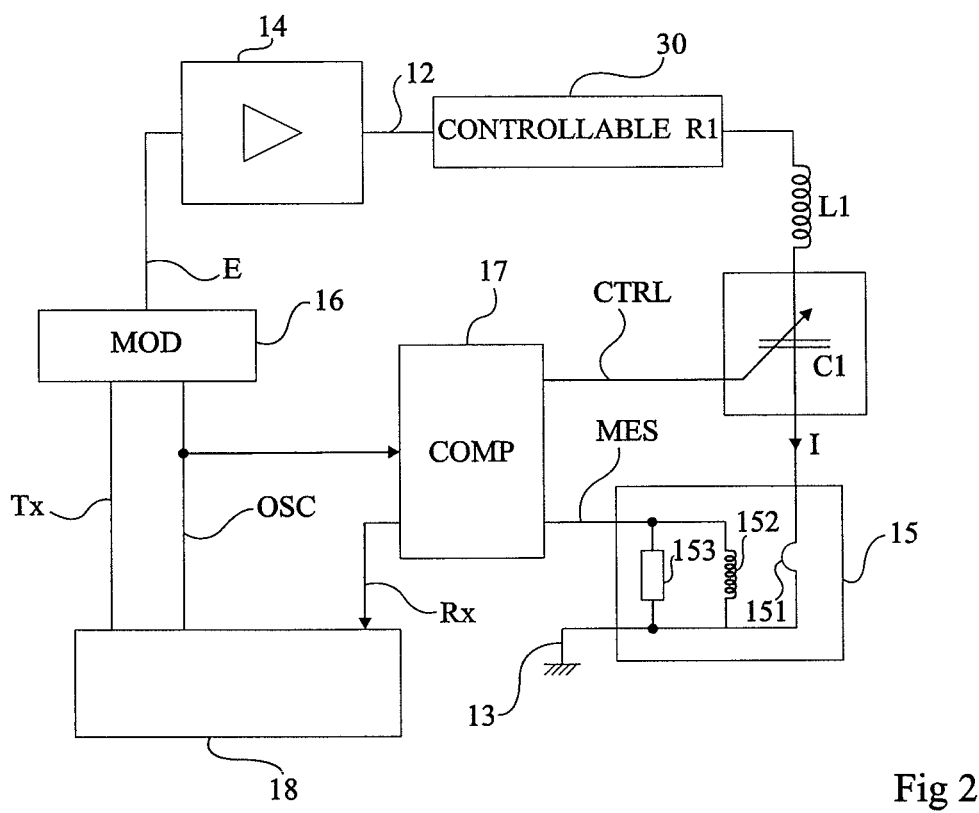
FIG. 2 is a simplified block diagram of the terminal of FIG. 1.

FIG. 2 is a block diagram of an embodiment of a terminal 1. As indicated previously, terminal 1 comprises an oscillating circuit formed of an inductance or antenna L1 in series with a capacitive element C1 and a resistive element R1. In the example of FIG. 2, these elements are connected between an output terminal 12 of an amplifier or antenna coupler 14 and a terminal 13 at a reference voltage (generally, the ground). An element 15 for measuring the current in the oscillating circuit is interposed, for example, between capacitive element C1 and ground 13. Measurement element 15 belongs to a phase regulation loop which will be described hereafter. Amplifier 14 receives a high-frequency transmission signal E, originating from a modulator 16 (MOD) which receives a reference frequency (signal OSC), for example, from a quartz oscillator (not shown). Modulator 16 receives, if need be, a signal Tx of data to be transmitted and, in the absence of a data transmission from the terminal, provides a high-frequency carrier (for example, at 13.56 MHz) capable of remotely supplying a transponder. Capacitive element C1 is an element with a variable capacitance controllable by a signal CTRL. A phase regulation of the current in antenna L1 is performed with respect to a reference signal. This regulation is a regulation of the high-frequency signal, that is, of the signal of the carrier corresponding to signal E in the absence of data to be transmitted. The regulation is performed by varying capacitance C1 of the terminal's oscillating circuit to maintain the current in the antenna in constant phase relation with the reference signal. This reference signal for example corresponds to signal OSC provided by the oscillator to the modulator. Signal CTRL originates from a circuit 17 (COMP) having the function of detecting the phase interval with respect to the reference signal and of accordingly modifying capacitance element C1. The phase measurement is performed, for example, based on a measurement of current I in the oscillating circuit by means of measurement element 15. In the shown example, a current transformer comprises a primary winding 151 between element C1 and ground terminal 13, and a secondary winding 152 having a first terminal directly connected to ground and having its other terminal providing a signal MES indicative of the result of the measurement. A current-to-voltage conversion resistor 153 is connected in parallel with secondary winding 152. The result of measurement MES is sent to comparator 17 which accordingly controls capacitive element C1 by means of signal CTRL.

In the embodiment illustrated in FIG. 2, comparator 17 uses the same phase demodulator (not shown) as that which is used to demodulate the signal originating from the transponder, which may be received by the oscillating circuit. Accordingly, comparator 17 provides a signal Rx giving back a possible retromodulation of data received from a transponder to a block 18 symbolizing the rest of the electronic circuits of the terminal.

The response time of the phase regulation loop is selected to be sufficiently long to avoid disturbing the possible retromodulation from a transponder, and sufficiently short as compared with the speed at which a transponder crosses the field of the terminal. This can be called a static regulation with respect to the modulation frequencies (for example, a 13.56-MHz frequency of the remote-supply carrier and a 847.5-kHz retromodulation frequency used to transmit data from the transponder to the terminal).

As a variation with respect to the current transformer of FIG. 2, other current measurement elements may be used (for example, a resistor).

An example of a terminal with a phase regulation is described in document EP-A-0857981.

Figure 3:
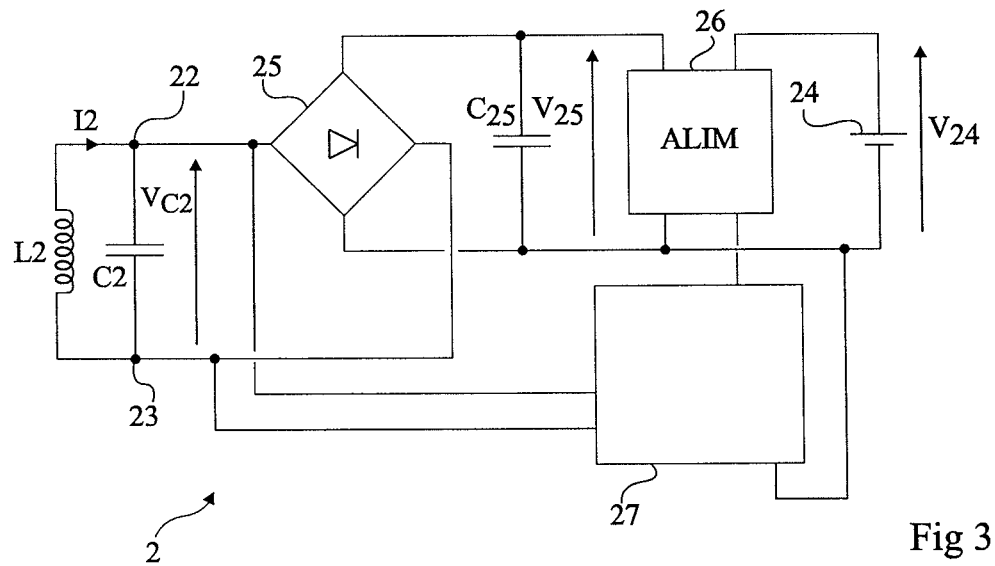
FIG. 3 is a simplified block diagram of the transponder of FIG. 1.

FIG. 3 shows an embodiment of a transponder 2. A rectifying element 25, for example, a fullwave diode bridge is connected between terminals 22 and 23 of the oscillating circuit (inductance or antenna L2 and capacitive element C2 in parallel). The rectified outputs of bridge 25 are connected by a smoothing capacitive element $C_{25}$ and provide a voltage $V_{25}$ to a circuit 26 (ALIM) for managing the transponder supply. Circuit 26 further receives a voltage $V_{24}$ provided by battery 24 of the transponder. Circuit 26 provides the other transponder circuits symbolized by a block 27 with the power necessary to their operation. Elements 25, $C_{25}$, 26, and 27 are, in FIG. 1, comprised within block 21. Circuit 27 samples information between terminals 22 and 23 of the resonant circuit to be able to demodulate the possible information received from the terminal before rectification. Further, circuit 27 comprises so-called retromodulation capacitive and/or resistive elements capable of modulating the load formed by the transponder on the field generated by the terminal. This load modification translates on the terminal side as a modification of the current or of the voltage of the oscillating circuit (assuming that the amplifier or antenna coupler is capable of providing a constant current). This current or voltage modification sensed by the intensity transformer (15, FIG. 2) or any other measurement element (for example, for measuring the voltage across capacitive element C1) enables the terminal to decode the information received from the transponder.

A difficulty is to place the transponder to be recharged in a position corresponding to an inductive coupling generating a sufficient power source to recharge its battery with an acceptable recharge time.

The fact for the phase to be regulated on the terminal side enables exploiting current and voltage measurements in the oscillating circuit of the terminal to deduce information relative to the transponder coupling when it is in the field of the terminal.

Such information takes into account, especially, the coupling between the transponder and the terminal, that is, the coupling coefficient between the oscillating circuit of the terminal and that of the transponder. This coupling coefficient essentially depends on the distance separating the transponder from the terminal. The coupling coefficient, noted k, between the oscillating circuits of a transponder and of a terminal always ranges between 0 and 1. This coefficient can be defined by the following formula:

$$k = \frac{M}{\sqrt{L1 L2}}, \qquad \text{(formula 1)}$$

where M represents the mutual inductance between inductances L1 and L2 of the oscillating circuits of the terminal and of the transponder.

The different relations linking the electric quantities measureable by the terminal in different configurations of operation with a transponder are used to optimize the recharge of a battery equipping the transponder and more generally the power transfer to its power storage element $C_{25}$ or 26. For this purpose, series resistance R1 of the oscillating circuit of the terminal is adapted to optimize the coupling. This functionality is illustrated in FIG. 2 by a block 30 (CONTROLLABLE R1) and will be better understood in relation with the description of FIGS. 4 and 5.

Resistance R1 is used to electrically adjust the charging terminal to place the coupling system in a so-called optimum coupling position. This position corresponds to that with the most power transfers from the charger to the transponder to be charged.

A difference with respect to adjusting the capacitive element of the oscillating circuit of the terminal (for example as in EP-A-1 154 367 already cited); which modifies the tuning of the oscillating circuit, is that an adjustment of the value of the resistance R1 alters the attenuation.

Information available on the terminal side when said terminal is equipped with a phase regulation loop is current I in the series oscillating circuit of the terminal. This current is linked to a so-called generator voltage (noted Vg) driving the oscillating circuit, and to apparent impedance $Z1_{app}$ of the oscillating circuit by the following relation:

$$I = \frac{V_G}{Z1_{app}}. \qquad \text{(formula 2)}$$

The fact of regulating the phase of the oscillating circuit on a reference value allows for the distance variation of a transponder entering the field of a terminal to only translate as a modification of the real part of the impedance of this oscillating circuit. Indeed, all the variations which would tend to modify, statically with respect to the modulation frequencies, the imaginary part of the load formed by the transponder, are compensated for by the phase regulation loop. It is thus ensured that in static operation, the imaginary part of impedance $Z1_{app}$ is zero. Accordingly, impedance $Z1_{app}$ becomes equal to apparent resistance $R1_{app}$ and can be expressed as:

$$Z1_{app} = R1_{app} \qquad \text{(formula 3)}$$
$$= R1 + a^2 \cdot \frac{L2}{R2 \cdot C2},$$

with $$a^2 = \frac{k^2 \cdot \omega^2 \cdot L1 \cdot L2}{X2^2 + \left(\frac{L2}{R2 \cdot C2}\right)^2}, \qquad \text{(formula 4)}$$

where ω represents the signal pulse, X2 represents the imaginary part of the impedance of the oscillating circuit of the transponder (X2=ωL2−1/ωC2), and where R2 represents the load formed by the transponder elements on its own oscillating circuit (elements of circuit 21 modeled by resistor R2 in parallel on inductance L2 and capacitor C2). In other words, resistor R2 represents the equivalent resistance of all the transponder circuits (microprocessor, retromodulation means, etc.), brought in parallel on capacitor C2 and inductance L2. In the above formula 3, the series resistance of inductance L1 which adds to the other two terms has been neglected. It can also be considered that the value of this series resistance is, by simplification, included in the value of resistance R1.

By combining formulas 2, 3, and 4, current I can be expressed as follows:

$$I = \frac{Vg}{R1 + k^2 \cdot \frac{\omega^2 \cdot L1 \cdot L2^2}{Z2^2 \cdot R2 \cdot C2}}, \qquad \text{(formula 5)}$$

with:

$$Z2^2 = X2^2 + \left(\frac{L2}{R2 \cdot C2}\right)^2, \qquad \text{(formula 6)}$$

with Z2 representing the impedance of the transponder. Further, on the transponder side, one can write:

$$Z2 \cdot I2 = M \cdot \omega \cdot I = k \cdot \sqrt{L1 \cdot L2} \cdot \omega \cdot I \qquad \text{(formula 7)}$$

where I2 represents the current in the oscillating circuit of the transponder. Thereby:

$$I2 = \frac{k \cdot \sqrt{L1 \cdot L2} \cdot \omega \cdot I}{Z2}. \qquad \text{(formula 8)}$$

Formula 8 combined with formulas 4 and 6 can be reduced to the following expression:

$$I2 = a \cdot I. \qquad \text{(formula 9)}$$

Voltage $V_{C2}$ recovered across capacitor C2 of transponder 2 is given by the following relation:

$$VC2 = \frac{I2}{\omega \cdot C2} \qquad \text{(formula 10)}$$

-continued $$= \frac{a \cdot I}{\omega \cdot C2}.$$

As a first approximation, the following can be written by combining formulas 5 and 6 in which imaginary part X2 of impedance Z2 is close to 0 at the first order (the circuit is tuned):

$$I = \frac{Vg}{R1 + k^2 \cdot \frac{L1}{L2} \cdot R2}, \qquad \text{(formula 11)}$$

and recovered voltage $V_{C2}$ can be calculated in the same conditions by the following formula:

$$V_{C2} = k \cdot \sqrt{\frac{L1}{L2}} \cdot \frac{Vg}{\frac{R1}{R2} + k^2 \cdot \frac{L1}{L2}}. \qquad \text{(formula 12)}$$

Among the electric quantity measurements which are easily implementable on the terminal side, it is provided to use values off-load and at the maximum coupling which will be defined hereafter.

The off-load values represent the current and the voltage when no transponder is present in the field of the terminal. In this off-load operation, the apparent impedance, called $Z1_{off\text{-}load}$, of the oscillating circuit of the terminal now only depends on its components R1, L1, and C1. Further, due to the phase regulation, the imaginary part of this impedance is always zero. One can thus write:

$$I_{off\text{-}load} = \frac{Vg}{R1}. \qquad \text{(formula 13)}$$

The optimum coupling is defined as being the position at which voltage $V_{C2}$ recovered across the transponder is maximum. This optimum coupling, noted $k_{opt}$, can be expressed as:

$$k_{opt} = \sqrt{\frac{L2 \cdot R1}{L1 \cdot R2}} \qquad \text{(formula 14)}$$

Maximum voltage $V_{C2opt}$ at the optimum coupling is given by the following formula:

$$V_{C2opt} = \sqrt{\frac{R2}{R1}} \cdot \frac{Vg}{2}. \qquad \text{(formula 15)}$$

Another operating condition, determinable by means of the phase regulation, corresponds to a reference coupling noted $k_{ref}$ which is established for a given so-called reference distance between the transponder and the terminal. This reference condition corresponds, for example, to a calibration or an initialization of the system in a given situation. Preferably, this condition corresponds to a maximum coupling which corresponds to a minimum distance between the transponder and the terminal, for example, when the transponder is laid on the terminal, and thus as close as possible to the antenna.

Reference will be made hereafter to this maximum coupling condition, noted $k_{max}$, but all that will be described transposes to a reference condition by replacing the quantities identified at the maximum coupling with the reference coupling quantities.

Formulas 12 and 13 of current I and of recovered voltage $V_{C2}$ can be rewritten according to the coupling normalized by the optimum coupling ($k/k_{opt}$). Always assuming that imaginary part X2 of impedance Z2 is close to 0, the following is obtained:

$$V_{C2} = 2 \cdot V_{C2opt} \cdot \frac{\frac{k}{k_{opt}}}{1 + \left(\frac{k}{k_{opt}}\right)^2} \quad \text{(formula 16)}$$

$$I = \frac{I_{off-load}}{1 + \left(\frac{k}{k_{opt}}\right)^2}. \quad \text{(formula 17)}$$

One can thus write:

$$\left(\frac{k}{k_{opt}}\right)^2 = \frac{I_{off-load}}{I} - 1. \quad \text{(formula 18)}$$

Further, the value of voltage $V_{R1}$ across resistor R1 of the terminal is given by:

$$V_{R1} = \frac{Vg}{1 + \left(\frac{k}{k_{opt}}\right)^2} \quad \text{(formula 19)}$$

At the optimum coupling, that is, when $k=k_{opt}$:

$$I_{opt} = \frac{I_{off-load}}{2} = \frac{Vg}{2 \cdot R1},$$
and
$$V_{R1(opt)} = \frac{Vg}{2}.$$

The voltage across the oscillating circuit of the terminal is given by:

$$V_1 = \frac{Vg}{1 + \left(\frac{k}{k_{opt}}\right)^2}$$

and also reaches value Vg/2 in optimum coupling position.

The information relative to the optimum and maximum couplings may be used to adapt terminal 1 to the transponder 2 that it needs to recharge. For example, a transponder type may be dedicated to a type of coupling (remote or close) with a reader. The reader can thus stand several operating modes according to the position of maximum coupling with the transponder, by adapting its resistance R1 to the operating mode of the transponder.

Figure 4:
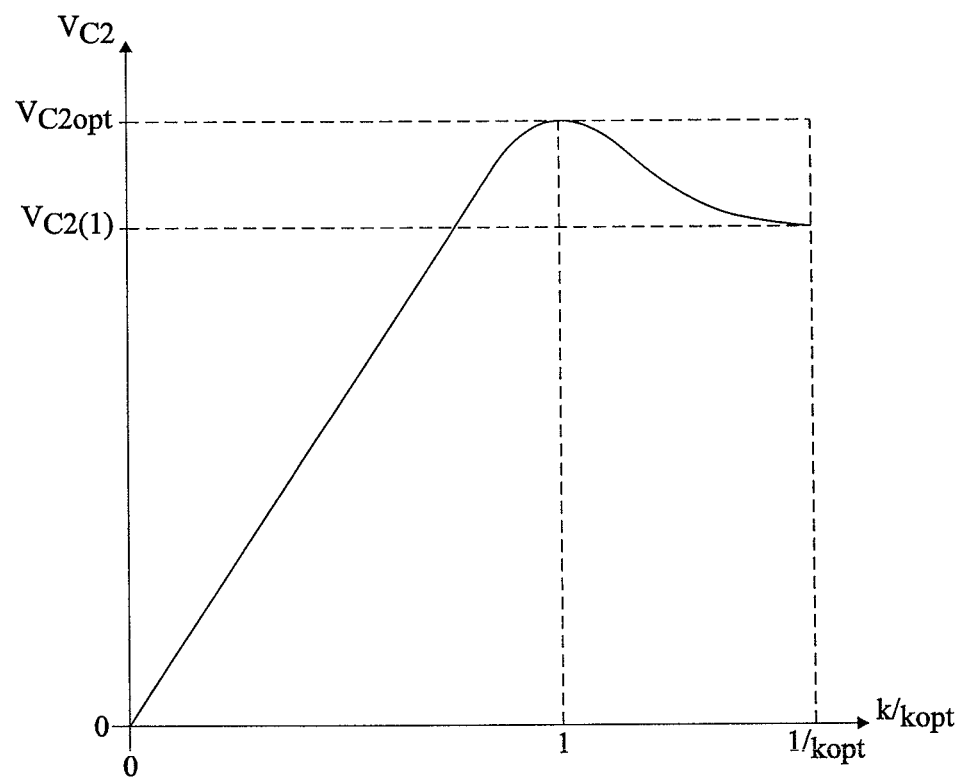
FIG. 4 illustrates the variation of the voltage across the resonant circuit of the transponder according to a normalized coupling.

FIG. 4 shows an example of the course of voltage $V_{C2}$ recovered on the transponder side according to normalized coupling $k/k_{opt}$.

The curve starts from the origin of the ordinates (zero voltage) for a null coupling. This corresponds to a distance between the transponder and the terminal such that no signal is received by the transponder. Voltage $V_{C2}$ reaches a maximum $V_{C2opt}$ for an optimum coupling coefficient $k_{opt}$ ($k/k_{opt}=1$), then decreases to an intermediary value $V_{C2}(1)$ reached at coupling 1.

The position which corresponds to a null coupling corresponds to an off-load position of the terminal, and thus to the off-load current ($I_{off-load}$). In this position, voltage $V_{R1}$ is equal to off-load value Vg.

In the optimum coupling position ($k=k_{opt}$), current $I_{opt}=I_{off-load}/2$ and voltage $V_{R1opt}=Vg/2$.

In a coupling position k equal to 1, current I corresponds to $$\frac{I_{off-load}}{1 + \left(\frac{1}{k_{opt}}\right)^2}$$

and voltage $V_{R1}$ is equal to $$\frac{Vg}{1 + \left(\frac{k}{k_{opt}}\right)^2}.$$

This position is a theoretic position since a coupling coefficient k=1 is in reality never achieved.

When the transponder is laid on the terminal, the coupling is considered to be at a maximum value and one can write:

$$I_{kmax} = \frac{I_{off-load}}{1 + \left(\frac{k_{max}}{k_{opt}}\right)^2}, \quad \text{(formula 20)}$$

and $$V_{R1_{kmax}} = \frac{Vg}{1 + \left(\frac{k_{max}}{k_{opt}}\right)^2}. \quad \text{(formula 21)}$$

Thus, the measurement of current $I_{max}$ or of voltage $V_{R1max}$ in a training phase where the portable object to be recharged is laid on the terminal is sufficient to determine maximum coupling $k_{max}$ with respect to optimum coupling $k_{opt}$.

A situation where $I_{max}$ is smaller than $I_{off-load}/2$ (where $V_{R1max}$ is smaller than Vg/2) corresponds to a position where the maximum coupling is greater than the optimum coupling. The optimum coupling then corresponds to a position of the transponder more distant from the terminal than when it is laid on it. In other words, the optimum coupling may be reached by moving the transponder away from the terminal and there exists a distance between the transponder and the charger for which the recovered voltage $V_{C2}$ then crosses maximum $V_{C2opt}$. Maximum $V_{C2opt}$ does not correspond to value $V_{C2max}$ and this value $V_{C2max}$ is smaller than $V_{C2opt}$.

A situation where current $I_{max}$ is greater than value $I_{off-load}/2$ (or $V_{R1max}$ is greater than Vg/2) corresponds to a position where the maximum coupling is smaller than the optimum coupling. This means that optimum coupling $k_{opt}$ corresponds to a theoretical value which is never physically reached since in this case, the voltage recovered at maximum coupling $V_{C2max}$ will not cross maximum $V_{C2opt}$ of the optimum coupling. In other words, at the maximum coupling, value $V_{C2max}$ will always be smaller than value $V_{C2opt}$.

In the two above cases, the transponder to be recharged cannot in principle benefit from the possible voltage maximum $V_{C2opt}$ to recharge the embarked battery since value $V_{C2max}$ is smaller than value $V_{C2opt}$.

It is then provided to modify the value of the series resistance (R1) of the terminal so that the maximum coupling point corresponds to the optimum coupling to thus benefit from the maximum recoverable voltage $V_{C2opt}$.

For this purpose, at the maximum coupling, when the transponder is laid on the terminal, the value of current I is measured, that is, $I_{max0}$ with an initial value, noted $R1_0$, of resistance R1. Since the terminal will previously have measured and stored off-load value $I_{off-load}$, whether the value of resistance R1 must be modified can be determined.

If ratio $I_{off-load}/I_{max0}$ is greater than 2 ($k_{max}/k_{opt0}>1$), where $k_{opt0}$ designates the optimum coupling with value $R1_0$, the optimum coupling of the terminal-transponder system corresponds to a position more distant from the terminal than when the transponder is laid on it and this, with resistance $R1_0$.

If ratio $I_{off-load}/I_{max0}$ is smaller than 2 ($k_{max}/k_{opt0}<1$), optimum coupling $k_{opt}$ corresponds to a theoretical value never physically obtained with the value of resistance $R1_0$.

In both cases, it however remains possible to modify the value of resistance R1 so that its new value, noted $R1_1$, has the optimum coupling of the system $k_{opt}$ coincide with the value of maximum coupling $k_{max}$, to benefit from the maximum recoverable voltage $V_{C2opt}$ to recharge the transponder battery or charge its capacitor 25. Thus, the value of the initial optimum coupling of the system is adapted by modifying the value of series resistance R1 so that it corresponds to the maximum coupling of the transponder, that is, once laid on the terminal in recharge position. This amounts to passing from value $R1_0$ to a value $R1_1$ such that the value of current I reaches $I_{off-load}/2$, that is, corresponds to the critical optimum coupling.

Previously disclosed formula 20 enables writing:

for value $R1_0$:

$$\left(\frac{k_{max}}{k_{opt0}}\right)^2 = \frac{I_{off-load}}{I_{max0}} - 1,$$

with $$k_{opt0} = \sqrt{\frac{L2}{R2} \cdot \frac{R1_0}{L1}},$$

and for value $R1_1$:

$$\left(\frac{k_{max}}{k_{opt1}}\right)^2 = \frac{I_{off-load}}{I_{max1}} - 1$$
$$= 1$$

(since by definition $R1_1$ enables to achieve the maximum coupling, which amounts to saying that $I_{off-load}/I_{max1}=2$), with $$k_{opt1} = \sqrt{\frac{L2}{R2} \cdot \frac{R1_1}{L1}},$$

where $I_{max1}$ and $k_{opt1}$ respectively designate maximum current $I_{max}$ and optimum coupling $k_{opt}$ for value $R1_1$ of resistance R1.

The above equation system leads to:

$$\left(\frac{k}{k_{opt1}}\right)^2 = \frac{R1_0}{R1_1} \cdot \left(\frac{k}{k_{opt0}}\right)^2, \quad \text{(formula 22)}$$

and:

$$R1 = R1_0\left(\frac{I_{off-load}}{I_{max0}} - 1\right). \quad \text{(formula 23)}$$

The value of resistance R1 is thus set either by being decreased when value $k_{max}$ is smaller than value $k_{opt}$, either by being increased when the value of $k_{max}$ is greater than value $k_{opt}$, so that the value of current I reaches $I_{off-load}/2$ that is, corresponds to the critical optimum coupling. The value of resistance R1 may also be set to reach the optimum coupling based on measurements of voltage $V_{R1}$ across resistor R1. In this case, the value of resistance R1 is set so that voltage $V_{R1}$ (or voltage $V_{L1C1}$) across the oscillating circuit reaches value Vg/2 at the optimum coupling.

Value $R1_0$ may correspond to a coupling position corresponding either to maximum $k_{max}$, or to any other reference value of the coupling coefficient in the case where the active transponder is at a given distance from the terminal. Such will for example be the case for a transponder assembled on a vehicle wheel which recharges each time it crosses a so-called reference position. In an example of this type, the training phase may comprise an additional preliminary phase in which, during a full rotation of the wheel, the system notes the position corresponding to the maximum recovered voltage $V_{C2}$ and measures current $I_{max}$ at this reference maximum coupling position. The terminal then adapts the value of, resistance R1 so that for each crossing of the reference position, recovered voltage $V_{C2}$ corresponds to the optimum coupling, and thus to the maximum recoverable voltage to recharge capacitive element $C_{25}$ (and possibly battery 24 if it exists) of the transponder.

Figure 5:
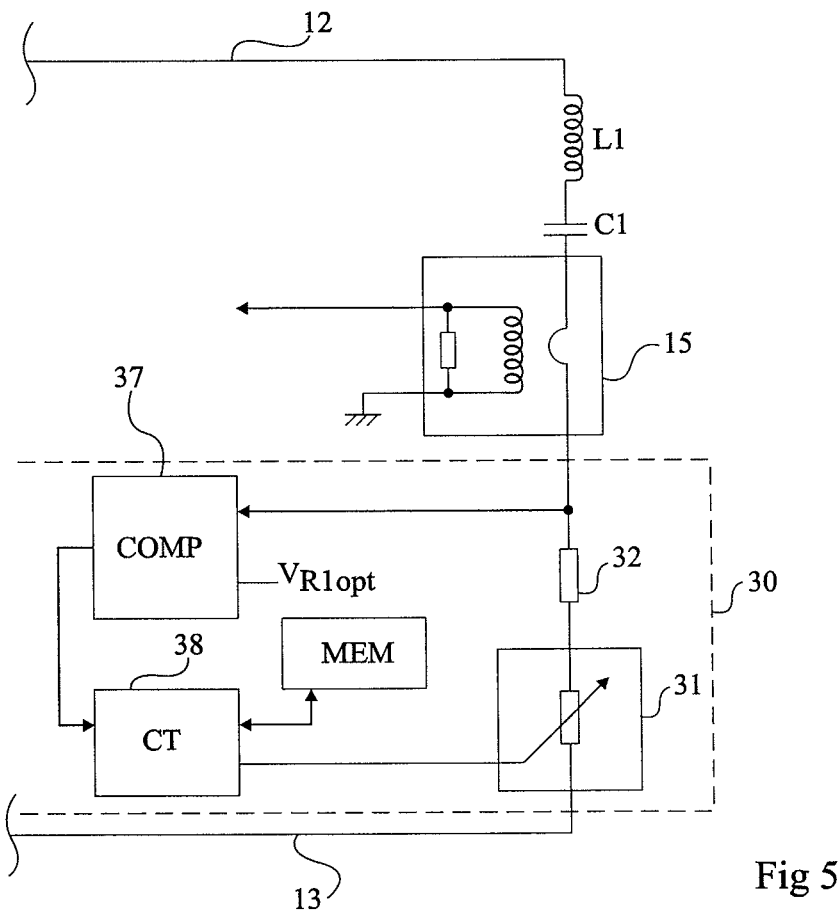
FIG. 5 is a partial block diagram illustrating another embodiment of a circuit of switchable resistors of the terminal of FIG. 2.

FIG. 5 is a block diagram to be compared to that of FIG. 2 partially illustrating an embodiment of a circuit 30. In this example, a variable resistor 31 is series-connected with a fixed resistor 32, both resistors 31 and 32 forming current resistive element R1 of the terminal. The voltage across this resistive element is measured and compared by a comparison circuit 37 (COMP) with a value $V_{R1opt}$ which corresponds to the voltage at the optimum coupling point. The result provided by comparator 37 is used to control the value of resistive element 31 with value $V_{R1opt}$ by means of a control circuit 38 (CT). The other elements of the terminal are identical to those described in relation with FIG. 2. However, in the example of FIG. 5, circuit 30 is placed on the side of ground terminal 13 rather than on the side of output terminal 12 of amplifier 14 (not shown in FIG. 5). Current transformer 15 used for the measurement for the phase control is interposed between capacitive element C1 and circuit 30. Capacitance C1 is preferably also variable, although this has not been illustrated in FIG. 5.

Figure 6A:
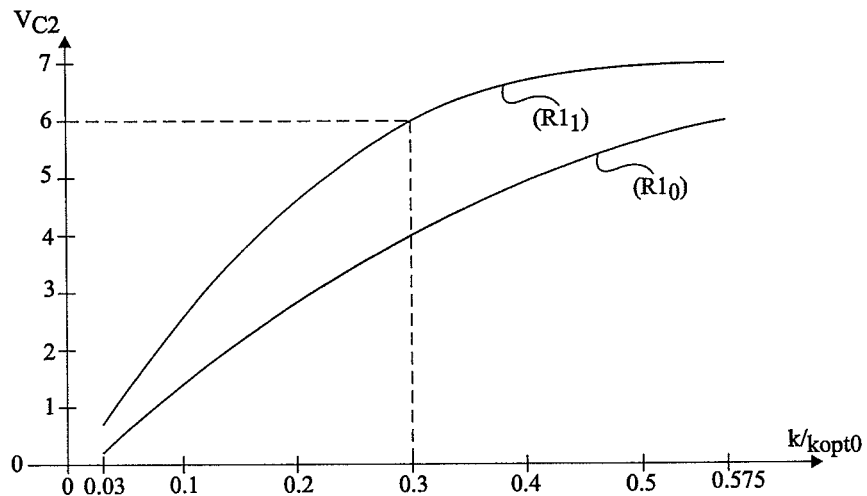
FIGS. 6A, 6B, and 6C are graphs illustrating the operation of the terminal.
Figure 6B:
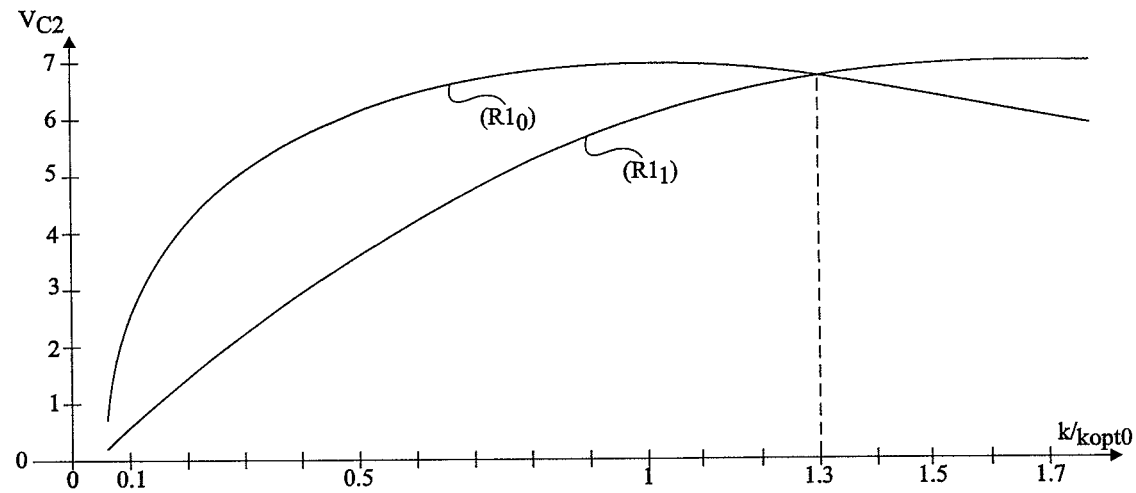
Figure 6C:
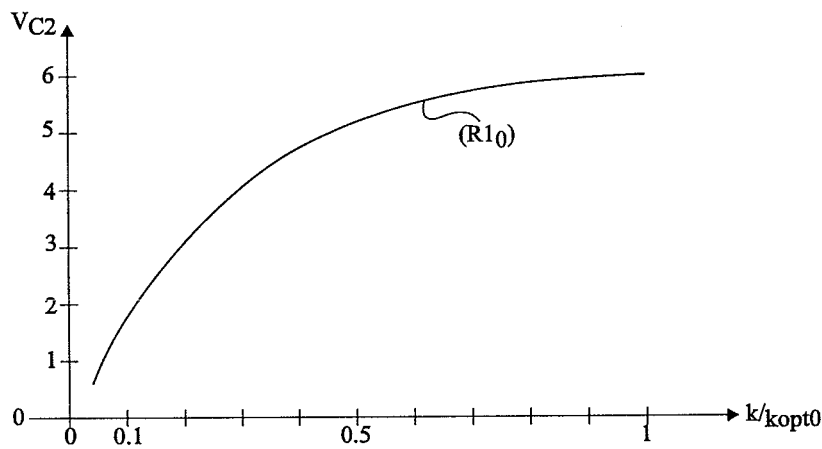

FIGS. 6A, 6B, and 6C illustrate the operation of the terminal of FIG. 5.

These curves illustrate examples of relations between voltage $V_{C2}$ across the transponder capacitor and normalized coupling coefficient $k/k_{opt0}$. It is assumed that the voltage desirable to enable a recharge of the battery is at least 6 volts. This level represents the ratio between voltage $V_{C2max}$ at coupling $k_{max}$ and resistance $R1_0$ determined as indicated hereabove. A coupling coefficient $k_{opt0}$=0.3 is also assumed.

In the case of FIG. 6A, a ratio $I_{off-load}/I_{max0}$ of 4/3 between the off-load current and the maximum current with resistance $R1_0$ is assumed. The ratio between coefficients $k_{max0}$ and $k_{opt0}$ is 0.58. This thus is a case where, with resistance $R1_0$, the optimum coupling cannot be reached. FIG. 6A shows that in such conditions, a modification of the value of resistance R1 to a value $R1_1$ selected as indicated hereabove enables optimizing the recharge. In this example, a ratio $R1_1R1_0$ of 0.33 optimizes the recharge by enabling recovery of a voltage $V_{C2}$ of 7 volts for a distance representing a coefficient k of more than 0.15 (ratio $k/k_{opt0}$ greater than approximately 0.5), and of more than 6 volts by coming closer, to reach a distance representing a coefficient k of 0.09 (ratio $k/k_{opt0}$ of approximately 0.3).

In the case of FIG. 6B, a ratio $I_{off-load}/I_{max0}$ of 4 (greater than 2) between the off-load current and the maximum current with resistance $R1_0$ is assumed. The ratio between coefficients $k_{max0}$ and $k_{opt0}$ is 1.73. This thus is a case where, with resistance $R1_0$, the transponder must be drawn away to reach the optimum position. FIG. 6B shows that in such conditions, a modification of the value of resistance R1 to a value $R1_1$ selected as indicated hereabove enables optimizing the recharge for relatively short distances (shorter than the optimal distance with resistance $R1_0$). In this example, a ratio $R1_1/R1_0$ of 3 enables optimizing the recharge by enabling recovery of a voltage $V_{C2}$ of more than 6.8 volts from a coefficient k of approximately 0.37 (ratio $k/k_{opt0}$ of approximately 1.3). For greater distances, value $R1_0$ provides a faster recharge.

In the case of FIG. 6C, a ratio $I_{off-load}/I_{max0}$ of 2 between the off-load current and the maximum current with resistance $R1_0$ is assumed. The ratio between coefficients $k_{max0}$ and $k_{opt0}$ is 1. FIG. 6C shows that in such conditions, value $R1_1$ provided by the calculations is identical to value $R1_0$. A change of value is thus useless.

Figure 7:
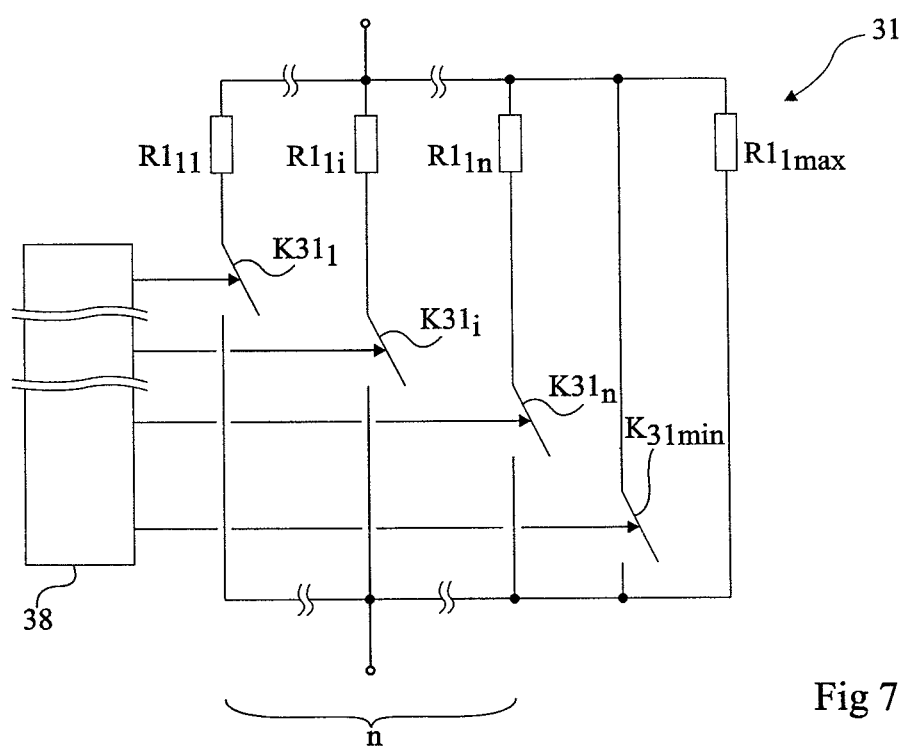
FIG. 7 is a partial diagram of another embodiment of an adaptation circuit on the terminal side.

FIG. 7 shows an example of a circuit of switchable resistors usable to implement the resistive selection (resistor 31). In this example, a resistor $R1_{1max}$ is in parallel with a switch $K_{31min}$ as well as with n branches of resistors $R1_{1i}$ (with i ranging between 1 and n) in parallel. Each resistor $R1_{1i}$ is in series with a controllable switch $K_{31i}$. These switches are controlled by circuit 38 according to the performed measurements. Switch $K_{31min}$ in closed position makes resistance R1 equal to resistance 32. When all switches $K_{31i}$ are off, the resistance of element 31 is $R_{1max}$. The other positions provide intermediary values.

Figure 8:
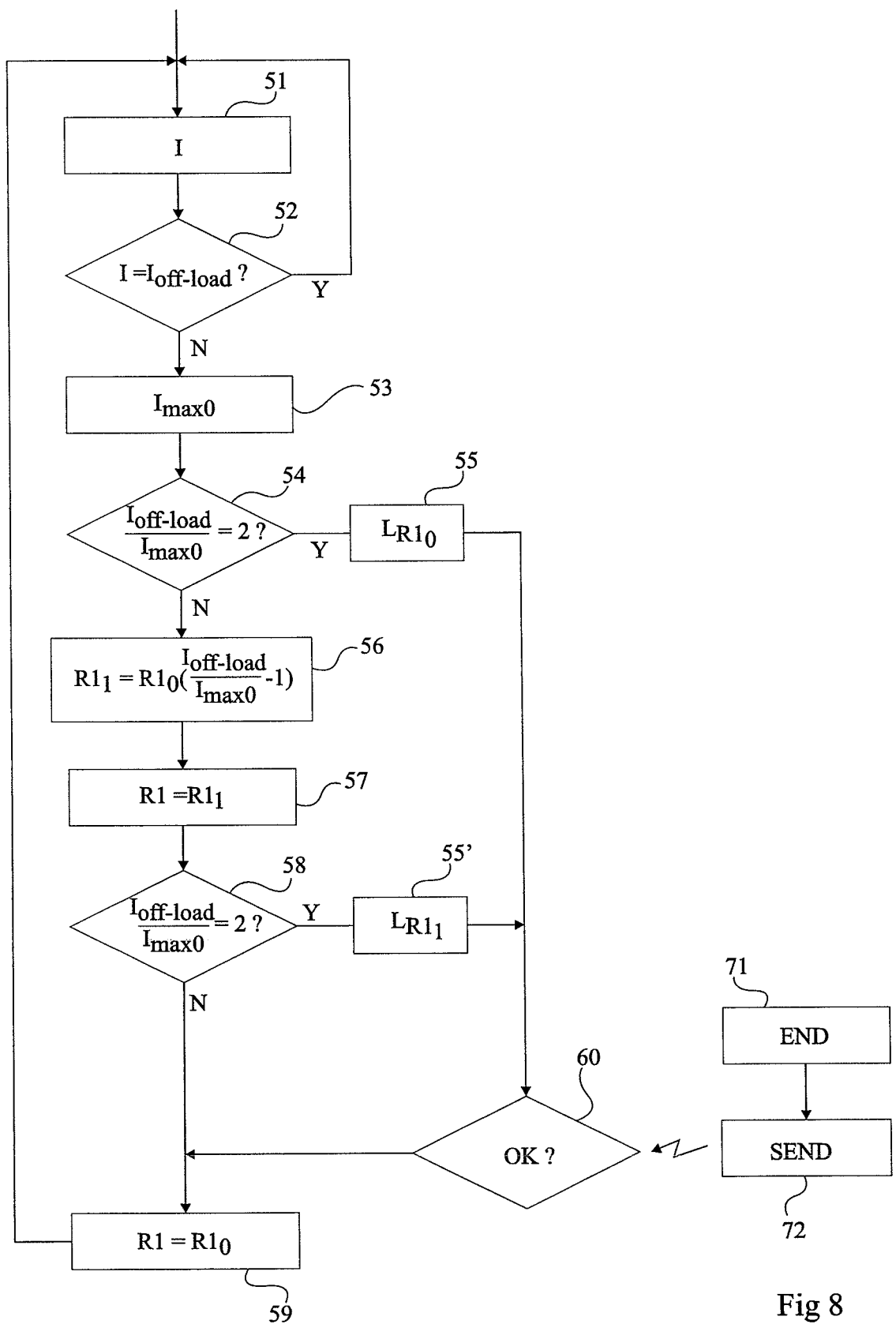
FIG. 8 is a flowchart illustrating an embodiment of a method for setting the terminal.

FIG. 8 is a flowchart of an embodiment of the resistance selection method. This flowchart illustrates the case of an exploitation of a measurement of the current but easily transposes to an exploitation of a measurement of the voltage across resistor R1. It always is information representative of the current in the oscillating circuit of the terminal.

The terminal is assumed to have previously been initialized in the off-load state and value $I_{off-load}$ (or any corresponding information) is assumed to have been stored. Such an initialization may be performed on manufacturing, but will preferably be performed on-site, or even periodically or on each powering-on, to take into account possible disturbances linked to the terminal's environment.

As a variation, in a first use of a terminal-transponder pair, the terminal displays a message asking the bearer to lay the transponder for acquisition. According to another variation, the terminal records an identifier of the transponder or of a category of transponders with the characteristic data and is thus able to recognize the next time it passes.

It is started by measuring (block 51, I) the value of the current in the oscillating circuit. This value is compared (block 52, I=$I_{off-load}$?) with the off-load value. In case of an equality (output Y of block 52), this means that no transponder is in the field and it is returned to the entry of block 51. Otherwise (output N of block 52), maximum current $I_{max0}$ is measured with resistance value $R1_0$ (block 53, Imax0), considering that the transponder is at a minimum distance (typically laid on the terminal). Then, the ratio between the off-load current and the current with resistance $R1_0$ is compared with constant 2 (block 54, $I_{off-load}/I_{max0}$=2?). This amounts to comparing the measured current with a value ($I_{off-load}/2$) which is a function of the off-load current. In case of an equality (output Y of block 54), the battery starts being charged by using resistor $R1_0$ (block 55, $L_{R10}$). Otherwise (output N of block 54), a resistance value $R1_1$ is calculated from value $R1_0$ and the previously-established ratio (block 56, $R1_1$=$R1_0$(($I_{off-load}/I_{max0}$)-1) and the closest value is selected from network 31. As a variation, a variable resistor is adapted. In other words, the value of resistance R1 is selected according to the first value ($R1_0$), to the measured information ($I_{max0}$), and to the constant ($I_{off-load}/2$). Then (block 57, R1=$R1_1$), the resistance value of the oscillating circuit is set (for example, by means of network 31 of FIG. 7) to correspond to the calculated value, $R1_1$. It is then checked (block 58, $I_{off-load}/I_{max0}$=2?) whether the selected value corresponds to the right coupling. If so (output Y of block 58), the recharge is performed with value $R1_1$ (block 55', $L_{R11}$). If not (output N of block 58), the setting of resistance R1 returns to original value $R1_0$ (block 59, R1=$R1_0$) and the process returns to the measurement of current I (block 51).

According to the shown example, when the transponder recharge occurs, be it with value $R1_0$ or with value $R1_1$, the terminal waits (block 60, OK?) for a message from transponder 2 indicating the end of the recharge. On the side of transponder 2, when the battery is integrally recharged (block 71, END), the transponder sends a message (block 72, SEND) to the terminal. When the terminal receives this message, it is detected by block 60 which then causes the switching of resistor R1 to initial value $R1_0$ (block 59). Then, it is returned to the current value monitoring block.

As a variation, step 58 is omitted and step 57 is directly followed by step 55'.

According to another variation, the adaptation of the value of resistance R1 is performed during the recharge. It is sufficient to periodically reproduce the steps of blocks 51, 52, 53, 54, 55, 56, 57, and 55' by replacing $R1_0$ with the current value of resistance R1.

Figure 9:
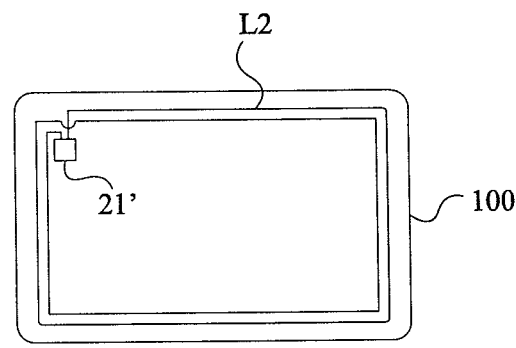
FIG. 9 very schematically shows a chip card of the type to which the present invention applies as an example.

FIG. 9 shows an example of a chip card 100 to which the present invention applies. In this example, circuit 21 is an integrated circuit chip comprising battery 24 and capacitive element C2. Antenna L2 is formed of a planar winding on the chip card or integrated into said card.

Figure 10:
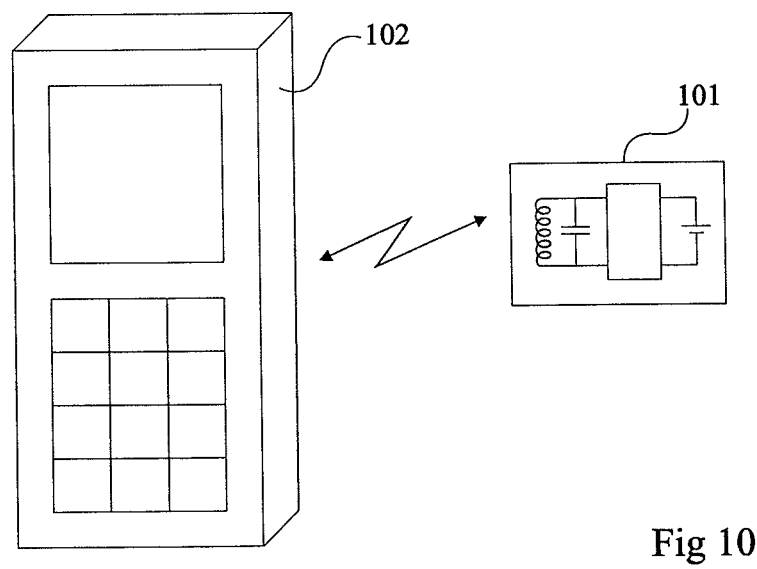
FIG. 10 very schematically shows a cell phone of the type to which the present invention applies as an example.

FIG. 10 illustrates another example of application according to which a chip card or electronic tag 101 is recharged by means of a mobile equipment of the type of a cell phone 102 or of a personal assistant. In this case and unlike the previously-disclosed terminal, another mobile element having a battery or power source sufficient to recharge transponder 101 is used as a terminal.

It is now possible to recharge a transponder in the fastest possible way by optimizing its coupling with the terminal or charger.

It is not necessary for a data transmission to be set up between the transponder and the terminal, the aim here only being to charge the transponder. However, such a communication is not excluded and may be simultaneous with the recharge.

It is further not necessary for the terminal to be dedicated to a transponder. Indeed, the different calculations, off-load measurements, measurements with different resistance values, enable adapting the impedance of the oscillating circuit of the terminal and especially its series resistance to optimize the recharge of any transponder within a wide range of values.

In its preferred embodiment, the implementation of the present invention especially translates as the storage, in the terminal, of a value of information representative, of the current in its off-load oscillating circuit (with no transponder within its range), and of a value of this information in a reference position of the transponder (typically laid on the terminal).

Different embodiments have been described. Various alternatives may be envisaged. In particular, although a few examples of application have been illustrated, the present invention applies whatever the type of active transponder which is desired to be charged. Further, the practical implementation of the described embodiments is within the abilities of those skilled in the art based on the functional indications given hereabove, using the tools generally available in the terminal (programmable logic, detectors, microprocessor, etc.).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for configuring a terminal capable of emitting a radio-frequency field for a transponder, comprising, in the presence of a transponder within the range of the terminal, at least one step of adapting a series resistance of an oscillating circuit of the terminal, according to an off-load value, which depends on an operation of the terminal while no transponder is in its field, to control coupling of radio frequency energy, at a reference frequency, from the oscillating circuit of the terminal to an oscillating circuit of the transponder, wherein said off-load value is characteristic of the current in the oscillating circuit of the terminal, further comprising the steps of:
measuring information representative of the current in the oscillating circuit of the terminal with a first value of series resistance of this oscillating circuit;
comparing this information with said off-load value; and
modifying the series resistance towards a second value selected according to the first value, to the measured information, and to said off-load value, comprising determining the second value as $$R1_1 = R1_0 \cdot \left( \frac{I_{off-load}}{I_{max0}} - 1 \right)$$

wherein $R1_1$ is the second value, $R1_0$ is the first value, $I_{off-load}$ is the off-load value and $I_{max0}$ is the measured current.

2. The method of claim 1, wherein the value of the series resistance is selected so that the ratio between the measured information and said off-load value is approximately equal to 2.

3. The method of claim 1, wherein a charge cycle of a battery comprised in the transponder is triggered once the value of the series resistance has been set.

4. An active transponder capable of communicating with a terminal, and capable of being recharged by said terminal according to claim 3.

5. The transponder of claim 4, comprising means for transmitting to the terminal information about the charge level of its battery.

6. A method for radio frequency transmission by a terminal to a transponder, comprising:
measuring a first current in an oscillating circuit of the terminal with a first series resistance value of the oscillating circuit and with the transponder within range of the terminal, comprising measuring the first current with maximum coupling between the terminal and the transponder;
determining a second series resistance value of the oscillating circuit of the terminal based on the measured first current and on an off-load current in the oscillating circuit with no transponder within range of the terminal, comprising determining the second series resistance value as $$R1_1 = R1_0 \cdot \left( \frac{I_{off-load}}{I_{max0}} - 1 \right)$$

wherein $R1_1$ is the second series resistance value, $R1_0$ is the first series resistance value, $I_{off-load}$ is the off-load current and $I_{max0}$ is the measured first current; and
transmitting radio frequency energy to the transponder using the second series resistance value in the oscillating circuit.

7. A method for radio frequency transmission as defined in claim 6, further comprising setting the second series resistance value to the first series resistance value if the off-load current is twice the measured first current.

8. A method for radio frequency transmission as defined in claim 6, further comprising adjusting the series resistance of the oscillating circuit from the first series resistance value to the second series resistance value if the off-load current is not twice the measured first current.

9. A method for radio frequency transmission as defined in claim 8, wherein adjusting the series resistance comprises selecting a resistor from a plurality of switchable resistors.

10. A method for radio frequency transmission as defined in claim 6, further comprising measuring the off-load current with no transponder within range of the terminal.

11. A terminal for generating a radio frequency field for a transponder, comprising:
an oscillating circuit including an inductance element, a capacitance element and a controllable series resistance;
a measurement element configured to measure a current in the oscillating circuit; and
a processor and a memory, the memory containing computer-executable instructions that, when executed by the processor, perform a method for radio frequency transmission comprising:

measuring, by the measurement element, a first current in the oscillating circuit with a first series resistance value and with the transponder within the range of the terminal, comprising measuring the first current with maximum coupling between the terminal and the transponder;

determining a second series resistance value based on the measured first current and on an off-load current in the oscillating circuit with no transponder within range of the terminal, comprising determining the second series resistance value as $$R1_1 = R1_0 \cdot \left(\frac{I_{off-load}}{I_{max0}} - 1\right)$$

wherein $R1_1$ is the second series resistance value, $R1_0$ is the first series resistance value, $I_{off-load}$ is the off-load current and $I_{max0}$ is the measured first current; and transmitting radio frequency energy to the transponder using the second series resistance value in the oscillating circuit.

12. A terminal for generating a radio frequency field as defined in claim 11, wherein the controllable series resistance includes a plurality of switchable resistors in series with a fixed resistor.

13. A terminal for generating a radio frequency field as defined in claim 11, wherein the measurement element includes a current transformer having a primary winding in series with the oscillating circuit.

14. A terminal for generating a radio frequency field as defined in claim 11, further comprising setting the second series resistance value to the first series resistance value if the off-load current is twice the measured first current.

15. A terminal for generating a radio frequency field as defined in claim 12, further comprising adjusting the controllable series resistance of the oscillating circuit from the first series resistance value to the second series resistance value if the off-load current is not twice the measured first current.

16. A terminal for generating a radio frequency field as defined in claim 15, wherein the controllable series resistance comprises a plurality of switchable resistors and wherein adjusting the controllable series resistance comprises selecting a resistor from the plurality of switchable resistors.

17. A terminal for generating a radio frequency field as defined in claim 11, wherein the method for radio frequency transmission further comprises measuring the off-load current with no transponder within range of the terminal.

\* \* \* \* \*